(12) United States Patent
Abe et al.

(10) Patent No.: US 7,537,711 B2
(45) Date of Patent: *May 26, 2009

(54) ELECTRICALLY CONDUCTIVE POLYANILINE COMPOSITION AND METHOD

(75) Inventors: Masao Abe, Osaka (JP); Akira Ohtani, Osaka (JP); Kuniaki Ishibashi, Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/892,463

(22) Filed: Aug. 23, 2007

(65) Prior Publication Data

US 2008/0054226 A1 Mar. 6, 2008

Related U.S. Application Data

(62) Division of application No. 10/149,227, filed as application No. PCT/JP00/08594 on Dec. 4, 2000, now Pat. No. 7,468,219.

(30) Foreign Application Priority Data

Dec. 10, 1999 (JP) .................................. 11-352378
Oct. 24, 2000 (JP) ............................. 2000-323818

(51) Int. Cl.
*H01B 1/12* (2006.01)
(52) U.S. Cl. .................................................... 252/500
(58) Field of Classification Search ................ 252/500; 525/504, 505
See application file for complete search history.

(56) References Cited

U.S. PATENT DOCUMENTS

| 4,820,595 | A | | 4/1989 | MacDiarmid et al. |
| 4,976,860 | A | * | 12/1990 | Takahashi et al. ...... 210/500.28 |
| 5,187,034 | A | | 2/1993 | Otagawa et al. |
| 5,298,235 | A | | 3/1994 | Worrell et al. |
| 6,099,989 | A | | 8/2000 | Harada et al. |
| 6,183,898 | B1 | | 2/2001 | Koschany et al. |
| 6,814,888 | B2 | * | 11/2004 | Kuwahara .................. 252/500 |
| 2005/0142413 | A1 | | 6/2005 | Kimura et al. |

FOREIGN PATENT DOCUMENTS

| EP | 0 300 082 | 1/1989 |
| JP | 59-25181 | 2/1984 |
| JP | 59-60967 | 4/1984 |
| JP | 60-180064 | 9/1985 |
| JP | 60-180065 | 9/1985 |
| JP | 61-124070 | 6/1986 |
| JP | 62-76256 | 4/1987 |
| JP | 64-28556 | 1/1989 |
| JP | 5-58227 | 8/1993 |

OTHER PUBLICATIONS

39th Meeting on Batteries, Preliminary Discourse, pp. 173-174 (1998).
67th Meeting of Electrochemical Society, Preliminary Discourse, p. 147 (2000).
Evelyn K.W. Lai et al., "Electrocatalytic Reduction of Oxygen by Platinum Microparticles Deposited on Polyaniline Films", Synthetic Metals, vol. 84, pp. 87-88 (1997).

* cited by examiner

*Primary Examiner*—Mark Kopec
(74) *Attorney, Agent, or Firm*—Wenderoth, Lind & Ponack, L.L.P.

(57) ABSTRACT

The invention provides a fuel cell which comprises a solid polymer electrolyte sandwiched between a cathode to which an oxidizing agent gas is supplied and an anode to which a reducing agent gas is supplied, wherein at least one of the electrodes has an electroconductive organic polymer which has an oxidation-reduction function as an electrode catalyst. The invention further provides a fuel cell in which the electrode catalyst comprises a mixture of an electroconductive organic polymer and an inorganic oxidation-reduction catalyst, and has a higher output power.

4 Claims, No Drawings

US 7,537,711 B2

ELECTRICALLY CONDUCTIVE POLYANILINE COMPOSITION AND METHOD

This is a divisional of Ser. No. 10/149,227, filed Oct. 8, 2002 now U.S. Pat. No. 7,468,219, which is a 371 of PCT/JP00/08594, filed Dec. 4, 2000.

FIELD OF THE INVENTION

The invention relates to a high power output fuel cell which has an electroconductive organic polymer having oxidation-reduction function as an electrode catalyst at least on one of the cathode and the anode.

BACKGROUND OF THE INVENTION

In recent years, a fuel cell which is composed of a plurality of unit cells electrically connected in series has been developed. The unit cell is composed of a solid electrolyte/electrode structure sandwiched between separators, and the solid electrolyte/electrode structure is composed of a solid polymer electrolyte sandwiched between an anode and a cathode. Such a fuel cell is attracting a great deal of attention as a power source in various uses, in particular, for electric vehicles or individual power sources for domestic use because of the feature that it is a clean and highly efficient power source.

More specifically, such a fuel cell containing a solid polymer electrolyte has a proton conductive ion exchange membrane sandwiched between a pair of electrodes, an anode and a cathode, each having an electrode catalyst thereon, as a basic constitution, and a reducing agent (fuel) such as hydrogen is made to contact with the surface of the anode while an oxidizing agent (oxygen) is made to contact with the surface of the cathode to cause an electrochemical reaction making use of which electric energy is taken out from between the pair of electrodes. Ion exchange membranes of fluorine resin are widely known as the above-mentioned proton conductive ion exchange membranes superior in basic properties, while carbon papers supporting platinum thereon as an electrode catalyst are widely known as anodes and cathodes.

On the other hand, electroconductive organic polymers exemplified by, for example, polyacetylene, polypyrrole or polyaniline, containing a dopant and having an oxidation-reduction function (redox function), are watched with interest as an electrode active material for use in lithium secondary batteries (Japanese Patent No. 1,845,557), and in addition, the use of electroconductive organic polymers as electroconductive polymer capacitors having prompt discharge function is also proposed (39Th Meeting on Batteries, Preliminary Discourse, p. 173 (1998); 67Th Meeting of Electrochemical Society, Preliminary Discourse, p. 147 (2000)).

However, the electroconductive organic polymer mentioned above has low energy density when being used as an electrode active material compared with inorganic oxides such as lithium cobaltate ($LiCoO_2$) or metals such as lithium which is presently in practical use. Thus, it is proposed that an electroconductive organic polymer is used as an electrode catalyst in order to supplement low energy density of such an electroconductive organic polymer, and that an oxidizing agent or a reducing agent is dissolved in an electrolyte in contact with the electroconductive organic polymer, thereby using a cell as if it was a fuel cell (JP-A-59-60967; JP-A-61-124070).

In such a cell, however, because both the oxidizing agent and the reducing agent are supplied as solutions, active materials diffuse into electrodes slowly so that a high output voltage is not obtained. The discharge rate is several milliamperes per square centimeter. Furthermore, the cell system is complicated and hence it is not practical.

The known fuel cell making use of a solid polymer electrolyte uses platinum as an electrode catalyst, as described above, and consequently, it is costly; leakage of acidic liquid or anode poisoning with carbon monoxide is encountered in the known fuel cell, which hinder practical use thereof. Yet a practical electrode catalyst has not been found apart from platinum.

The invention has been accomplished to solve the above-mentioned problems involved in the known fuel cells. Therefore, it is an object of the invention to provide a high output power and high voltage fuel cell which contains an electroconductive organic polymer as an electrode.

SUMMARY OF THE INVENTION

The invention provides a fuel cell which comprises a solid polymer electrolyte sandwiched between a cathode to which an oxidizing agent gas is supplied and an anode to which a reducing agent gas is supplied, wherein at least one of the electrodes has an electroconductive organic polymer which has an oxidation-reduction function as an electrode catalyst.

The invention further provides a fuel cell which comprises a solid polymer electrolyte sandwiched between a cathode to which an oxidizing agent gas is supplied and an anode to which a reducing agent gas is supplied, wherein at least one of the electrodes has a mixture of an electroconductive organic polymer which has an oxidation-reduction function and an inorganic oxidation-reduction catalyst as an electrode catalyst.

DESCRIPTION OF PREFERRED EMBODIMENTS OF THE INVENTION

According to the invention, at least one of the cathode and the anode has an electroconductive organic polymer which has an oxidation-reduction function (redox function) and preferably has an dopant as an electrode catalyst.

Such electroconductive organic polymers include, for example, polyacetylene, poly-p-phenylene, polyaniline, polypyrrole, polythiophene, polyindole, poly-2,5-diaminoanthraquinone, poly(o-phenylenediamine), poly(quinolinium) salt, poly(isoquinolinium) salt, polypyridine, polyquinoxaline, and polyphenylquinoxaline. The electroconductive organic polymer may have various kinds of substituents, such as, for example, alkyl, hydroxyl, alkoxyl, amino, carboxyl, sulfonic acid group, halogen, nitro, cyano, alkylsulfonic acid group, or dialkylamino group. These substituents are useful to adjust the oxidation-reduction potential of electroconductive organic polymers used.

The dopant preferably contains a sulfonic acid group, and may be exemplified by an ionic polymer sulfonic acid such as polyvinyl sulfonic acid or phenolsulfonic acid novolac resin, a low molecular weight organic sulfonic acid compound such as dodecyl-benzenesulfonic acid, among which is preferred an ionic polymer sulfonic acid, and in particular, a polymer sulfonic acid. However, in the invention, a self-doping electroconductive organic polymer such as polyaniline having a sulfonic acid group in the molecule is also included in the electroconductive organic polymer having a dopant therein.

According to the invention, such an electroconductive organic polymer that releases protons in oxidation reactions and consumes protons in reduction reactions is preferred among others, and such an electroconductive organic polymer that contains nitrogen atoms in the molecule is particularly preferred. There may be mentioned as such electroconductive organic polymers, for example, polyaniline, polyalkylaniline, polyindole, poly(o-phenylenediamine), polypyridine, polyquinoxaline or polyphenylquinoxaline.

The cathode and the anode may carry the same electroconductive organic polymer as an electrode catalyst, or may carry electroconductive organic polymers different from each other. However, it is preferred that the cathode carries a p-type electroconductive organic polymer and the anode carries an n-type electroconductive organic polymer so that a higher output voltage is obtained. Among the electroconductive organic polymers mentioned above, the p-type ones are polyaniline, polyalkylaniline and polyindole, whereas the n-type ones are poly(o-phenylenediamine), polypyridine, polyquinoxaline and polyphenylquinoxaline.

In general, whether a certain electroconductive organic polymer is p-type or n-type is determined by, for example, molding powder of electroconductive organic polymer to a disk, mounting a pair of electrodes on the disk, giving temperature difference between the two electrodes, and then examining which polarity the potential of the electrode at lower temperatures has. When the electrode at lower temperature has a plus potential, the electroconductive organic polymer in question is p-type, while when it has a minus potential, the electroconductive organic polymer in question is n-type, as already known. As an alternative method, an electroconductive organic polymer in question is subjected to measurement of cyclic voltammogram, and when the electro-conductive organic polymer has an oxidation peak and a reduction peak in a positive area in relation to an SCE (saturated calomel electrode), the polymer is p-type whereas when the electroconductive organic polymer has an oxidation peak and a reduction peak in a negative area in relation to an SCE, the polymer is n-type.

According to the invention, one of the electrodes may have an electroconductive organic polymer as an electrode catalyst and the other electrode may have a platinum catalyst, as in the known fuel cell. Further according to the invention, at least one of the electrodes of cathode and anode may carry a mixture of an electroconductive organic polymer and an inorganic oxidation-reduction catalyst as an electrode catalyst. The amount of electroconductive organic polymer used as an electrode catalyst is not specifically limited, but it is usually in the range of 0.5-100 mg per square centimeter of electrode.

The electroconductive organic polymer mentioned above may be obtained by a process already known. By way of example, the preparation of electroconductive polyaniline containing a polymer sulfonic acid as a dopant is explained.

The chemical oxidation polymerization of aniline using an oxidizing agent in the presence of a protonic acid provides powder of electroconductive polyaniline doped with the protonic acid used (i.e., electroconductive polyaniline composition) according to the method described in JP-A-3-28229. The electroconductive polyaniline is dedoped by immersing in an aqueous alkaline solution such as ammonia water, and the resulting powder is collected by filtration and dried to provide powder of polyaniline dedoped and soluble in many organic solutions, that is, powder of "oxidized and dedoped" polyaniline.

In more detail, aniline is reacted with an oxidizing agent such as ammonium peroxodisulfate in the presence of a protonic acid such as hydrochloric acid in a solvent, for example, in water or methanol, whereupon precipitates of electroconductive composition of polyaniline doped with the protonic acid used are formed as powder and they are collected by filtration. Then, the powder is added to an aqueous alkaline solution such as ammonia water to neutralize (i.e., to dedope) the electroconductive polyaniline composition, thereby providing powder of oxidized dedoped polyaniline comprised of repeating units having the formula (I):

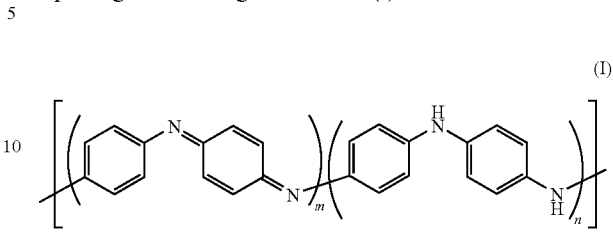

wherein m and n are molar fractions of quinonediimine structural units and phenylenediamine structural units in the repeated units, respectively, and are numerals satisfying the conditions: $0 < m \leqq 1$, $0 \leqq n < 1$, and $m+n=1$.

The oxidized and dedoped polyaniline thus obtained has high molecular weight, and yet it dissolves in various organic solvents. It has a limiting viscosity [η] of not less than 0.40 dl/g as measured at 30° C. in N-methyl-2-pyrrolidone, and it dissolves in such organic solvents as N-methyl-2-pyrrolidone, N,N-dimethylacetamide, N,N-dimethylformamide, dimethyl sulfoxide, 1,3-dimethyl-2-imidazolidinone, or sulfolane. The solubility of the oxidized dedoped polyaniline in these organic solvents depends on the average molecular weight of the polyaniline or the individual solvent in which the polyaniline is dissolved, but usually an amount of 0.5-100% of polyaniline dissolves and provides solutions of 1-30% by weight concentration. The oxidized and dedoped polyaniline has in particular high solubility in N-methyl-2-pyrrolidone, and usually an amount of 20-100% of polyaniline dissolves and provides solutions of 3-30% by weight concentration.

The values of m and n in the oxidized and dedoped polyaniline are adjusted by reduction or oxidation of the polyaniline. The reduction decreases the value of m and increases the value of n while the oxidation increases the value of m and decreases the value of n. When the polyaniline is reduced and the number of quinonediimine structural units in the polyaniline is decreased, the solubility of polyaniline in many organic solvents is increased, as well as the viscosity of solutions is decreased as compared with that of polyaniline before it is reduced. For the purpose of reducing such a solvent-soluble oxidized and dedoped polyaniline, phenylhydrazine is most preferably used from the standpoint that it is soluble in N-methyl-2-pyrrolidone, but it does not reduce N-methyl-2-pyrrolidone.

On the other hand, for the purpose of oxidizing such a solvent-soluble polyaniline, any oxidizing agent may be used so long as it is capable of oxidizing phenylenediamine structural units of polyaniline, however, for example, a mild oxidizing agent, such as silver oxide, is preferred. Potassium permanganate or potassium dichromate may be also used, if necessary, however.

Powder of the thus obtained oxidized and dedoped polyaniline is then added to an aqueous solution of a polymer sulfonic acid which has been made to be free acid by treating the salt with a strongly acidic cation exchange resin, and upon heating the mixture for several hours, the polyaniline is doped with the polymer sulfonic acid. Powder of the thus doped polyaniline is filtered, washed, and dried in vacuo, to provide powder of electroconductive polyaniline containing the polymer sulfonic acid as a dopant.

When a mixture of an electroconductive organic polymer and an inorganic oxidation-reduction catalyst is supported as an electrode catalyst at least on one of the electrodes, as mentioned hereinabove, at least one transition metal selected from the group consisting of platinum, palladium, ruthenium, rhodium, silver, nickel, iron, copper, cobalt and molybdenum, and/or an oxide of the transition metal, any being known as a hydrogenation catalyst or an oxygen autoxidation catalyst is used as the inorganic oxidation-reduction catalyst. The inorganic oxidation-reduction catalyst may be mixed as fine powder with powder of the electroconductive organic polymer, or powder of the electroconductive organic polymer is added to an aqueous solution of a water soluble salt of the transition metal, mixed with stirring to prepare a suspension, and then the transition metal salt is reduced or oxidized thereby to convert the transition metal to a metal or an oxide.

When a mixture of an electroconductive organic polymer and an inorganic oxidation-reduction catalyst is used as an electrode catalyst, the inorganic oxidation-reduction catalyst is used usually in an amount of 0.1-30 parts by weight in relation to 100 parts by weight of the electroconductive organic polymer. The amount of the inorganic oxidation-reduction catalyst supported on an electrode is usually in the range of 0.001-5 mg, preferably in the range of 0.005-1 mg, and most preferably in the range of 0.01-0.5 mg, per square centimeter of the area of the electrode.

As described above, the provision of a mixture of an electroconductive organic polymer and an inorganic oxidation-reduction catalyst on electrodes as an electrode catalyst provides a fuel cell which has higher output power than a fuel cell in which an electroconductive organic polymer alone is used as an electrode catalyst.

The production of electrodes used in the fuel cell of the invention will now be described. A cathode having an electroconductive organic polymer as an electrode catalyst is produced in the following manner, for example. If necessary, after powder of electroconductive polyaniline having a polymer sulfonic acid as a dopant is mixed with an electroconductive agent (for example, powder of electroconductive carbon black), a paste is prepared using the mixture and a solution of a binding agent (for example, polyvinylidene fluoride resin or polytetrafluoroethylene resin). The paste is coated on an electroconductive porous substrate (for example, carbon paper available from Toray K.K.) and dried, and then a solution of proton exchangeable resin (for example, perfluorosulfonic acid resin such as NAFION (registered trademark) available from Dupont) is applied on the thus treated electroconductive porous substrate and dried, thereby providing a cathode.

A cathode having a mixture of an electroconductive organic polymer and an inorganic oxidation-reduction catalyst as an electrode catalyst is prepared in a manner as follows, for example. Powder of electroconductive polyaniline having a polymer sulfonic acid as a dopant is mixed with powder of an inorganic oxidation-reduction catalyst, and if necessary, the resulting mixture is further mixed with an electroconductive agent (for example, powder of electroconductive carbon black). A paste is prepared using the mixture and a solution of a binding agent (for example, polyvinylidene fluoride resin or polytetrafluoroethylene resin). The paste is applied on an electroconductive porous substrate (for example, carbon paper available from Toray K.K.) and dried, and then a solution of proton exchangeable resin (for example, perfluorosulfonic acid resin such as NAFION (registered trademark) available from Dupont) is applied on the thus treated electroconductive porous substrate and dried, thereby providing a cathode.

In turn, an anode is prepared by reducing the cathode. Methods for the reduction is not specifically limited, and by way of example, the cathode may be reduced chemically. However, it is preferred that a cyclic voltammogram is measured in an aqueous solution of polymer sulfonic acid using an appropriate reference electrode and then the cathode is reduced electrochemically at an electric potential where a reduction peak has been observed.

An electrolyte membrane (e.g., proton exchangeable membrane) is then sandwiched between the cathode and the anode prepared as described above, and if necessary, these elements are molded with a hot press to an integral electrode/proton exchangeable membrane assembly for use in a fuel cell.

As an electrolyte membrane in the fuel cell of the invention, a cation exchange membrane composed of perfluorosulfonic acid resin such as NAFION (registered trademark) which has been used in the known solid polymer electrolyte membrane type cells is suitably used, but the electrolyte membrane used is not limited to the above-exemplified. For instance, a porous membrane comprised of a fluororesin such as polytetrafluoroethylene impregnated with NAFION or any other ion conductive material, or a porous membrane or nonwoven fabric comprised of a polyolefin resin such as polyethylene or polypropylene impregnated with NAFION or any other ion conductive material may also be used as an electrolyte membrane.

In the fuel cell of the invention, an oxidizing agent gas is supplied to a cathode while a reducing agent gas is supplied to an anode. According to the invention, it is preferred that an oxygen gas or air is used as the oxidizing agent while a hydrogen gas is used as the reducing agent. However, methanol or dimethyl ether may also be used as the reducing agent.

The fuel cell of the invention is operated at temperatures of not less than 40° C. More specifically, although depending on the electroconductive organic polymer or electrolyte membrane used, the fuel cell of the invention is operated at temperatures preferably in the range of 50-120° C., and most preferably in the range of 60-100° C. When the fuel cell is operated at too low temperatures, the reaction rate of the electroconductive organic polymer is slow so that high output power is not obtained and when it is operated at too high temperatures, there is a fear of degradation or separation of materials used therein.

EXAMPLES

The invention is explained in mode detail with reference to examples, but the invention is not limited to these examples.

Reference Example 1

Preparation of Electroconductive Polyaniline Composition by Oxidation Polymerization of Aniline 6000 g of distilled water, 360 mL of 36% hydrochloric acid and 400 g (4.295 mol) of aniline were placed in this order in a 10 L-capacity separable flask provided with a stirrer, a thermometer and an adapter tube to prepare an aqueous acidic solution of aniline.

434 g (4.295 mol) of concentrated sulfuric acid was added to and mixed with 1493 g of distilled water in a beaker while cooling the resulting mixture with ice water to prepare an aqueous solution of sulfuric acid. This aqueous solution of sulfuric acid was added to the acidic solution of aniline and then the entire flask was cooled to a temperature of −4° C. in a cryostat.

980 g (4.295 mol) of ammonium peroxodisulfate was dissolved in 2293 g of distilled water in a beaker to prepare an aqueous solution of an oxidizing agent. While the entire flask was cooled in a cryostat so that the mixture in the flask was cooled to a temperature of not more than –3° C., the solution of ammonium peroxodisulfate was dropwise added gradually to the acidic solution of aniline with stirring through the adapted tube using a tubing pump at a rate of not more than 1 mL/minute. At first, the reaction mixture was a colorless transparent solution, but as the reaction proceeded, the reaction mixture colored greenish blue and then blackish green, and then a blackish green precipitate was formed in the reaction mixture.

When the precipitate is formed, the temperature of the reaction mixture increases, however, it is important that the reaction system is kept at a temperature of not more than 0° C., preferably not more than –3° C., so that high molecular weight polyaniline is obtained. After the precipitation of powder, the solution of ammonium peroxodisulfate may be added to the acidic solution of aniline at an increased rate, for instance, at about 8 mL/minute. However, in this case also, it is necessary to keep the reaction mixture at a temperature of not more than –3° C. while monitoring the temperature of the reaction mixture.

In this manner, the aqueous solution of ammonium peroxodisulfate was added to the solution of aniline in seven hours, and after the addition, the reaction mixture was stirred for another one hour at a temperature of not more than –3° C.

The obtained powder was collected by filtration, washed with acetone, and dried at room temperatures in vacuo to provide 430 g of blackish green electroconductive polyaniline composition. The composition was press-molded to a disk having a diameter of 13 mm and a thickness of 700 μm. The disk was found to have an electro-conductivity of 14 S/cm as measured by the van der Pauw method.

Preparation of Electroconductive Polyaniline Soluble in Organic Solvents (Oxidized and Dedoped Polyaniline) by Dedoping of Electroconductive Polyaniline Composition)

350 g of powder of the doped electroconductive polyaniline composition was added to 4 L of 2 N ammonia water and stirred for five hours in a mixer at a rate of 5000 rpm, whereupon the mixture turned from blackish green to blue violet. The powder was collected with a Buchner funnel, and washed repeatedly with distilled water in a beaker with stirring until the filtrate became neutral, and then with acetone until the filtrate became colorless. Thereafter, the powder was dried in vacuo at room temperatures for ten hours to provide 280 g of powder of dedoped blackish brown polyaniline (oxidized and dedoped polyaniline).

The thus obtained polyaniline was soluble in N-methyl-2-pyrrolidone. The solubility was 8 g (7.4%) to 100 g of the solvent. The limiting viscosity [η] was 1.23 dl/g as measured at 30° C. using N-methyl-2-pyrrolidone as a solvent. The polyaniline was found to have a very slight solubility of not more than 1% in dimethyl sulfoxide or dimethylformamide, and was found not to dissolve in tetrahydrofuran, pyridine, 80% aqueous solution of acetic acid, 60% aqueous solution of formic acid or acetonitrile. Furthermore, the oxidized and dedoped polyaniline was found to have a number average molecular weight of 23000 and a weight average molecular weight of 160000 (in terms of molecular weight of polystyrene) from the results of GPC (gel permeation chromatography) measurement using GPC columns and N-methyl-2-pyrrolidone as a solvent.

Example 1

Sodium polyvinyl sulfonate (available from Aldrich) was treated with a strongly acidic cation exchange resin (DOWEX 50WX12 available from Dow Chemical) to prepare an aqueous solution of polyvinyl sulfonic acid. The solution was concentrated using a rotary evaporator, and dried in vacuo, to provide starch syrup-like polyvinyl sulfonic acid. 12.5 g of the polyvinyl sulfonic acid was dissolved in 70.8 g of ion exchange water to prepare a 15% by weight concentration aqueous solution of polyvinyl sulfonic acid.

10 g of powder of the oxidized and dedoped polyaniline obtained in Reference Example 1 was added to the aqueous solution of the polyvinyl sulfonic acid and heated at 70° C. with a hot water bath for 130 minutes so that the polyaniline was doped with the polyvinyl sulfonic acid. The thus doped polyaniline was suction-filtrated, washed with methanol, and dried in vacuo at 50° C. for four hours to provide powder of electroconductive polyaniline having polyvinyl sulfonic acid as a dopant and an electroconductivity of 11.5 S/cm. 2 g of powder of electroconductive polyaniline was mixed with 0.4 g of powder of electroconductive carbon black (KETJENBLACK EC available from Akzo), and the resulting mixture was ground for 10 minutes in a ceramic mortar to prepare a uniform mixture.

0.27 g of polyvinylidene fluoride resin (KYNAR available from Kureha K.K.) was dissolved in 10.53 g of N,N-dimethylformamide to prepare a 2.5% by weight concentration solution of the resin. The mixture of electroconductive polyaniline and electroconductive carbon black was added to the solution of polyvinylidene fluoride resin and mixed in a mortar to prepare a paste. The paste was applied to a 5.8 cm square carbon paper (TGP-H-90 available from Toray K.K., having a thickness of 260 μm) and dried at a temperature of 80° C. for 60 minutes in a hot air dryer. Then a 5% by weight NAFION solution (available from Aldrich) was applied on the thus treated carbon paper, heated and dried at a temperature of 80° C. for 15 minutes, thereby providing an electrode used as cathode.

The electrode was dipped in the 15% by weight concentration aqueous solution of polyvinyl sulfonic acid and a cyclic voltammogram was obtained using a potentiostat/galvanostat (HA-501) and a function generator (HB-105), both being available from Hokuto Denko K.K., a saturated calomel electrode (SCE) as a reference electrode and platinum wire of a diameter of 0.5 mm as a counterpart electrode under the conditions of potential range of from –0.2 to 0.5V vs. SCE and a sweep rate of 20 mV/sec. The oxidation peak of polyaniline was observed at 0.5 V vs. SCE while the reduction peak of polyaniline at –0.1 V vs. SCE. Accordingly, while the electric potential of potentiostat was fixed at –0.1 V, the cathode was electrochemically reduced for 30 minutes, thereby providing an electrode for use as an anode.

An acidic NAFION (registered trademark) 117 membrane (available from Dupont) was sandwiched between the thus prepared cathode and anode as a proton exchangeable membrane, and these elements were formed to an electrode-proton exchangeable membrane assembly at a temperature of 130° C. and a pressure of 3 MPa with a hot press. A single fuel cell for test was put together using the assembly.

This single fuel cell was incorporated into a fuel cell validation device (available from Toyo Corporation K.K.). While the cell was kept at a temperature of 70° C., oxygen gas was heated at a temperature of 70° C. in a humidifier and supplied to the cathode at a rate of 500 mL/min. and hydrogen gas was heated at a temperature of 80° C. in a humidifier and supplied to the anode at a rate of 500 mL/min. At first, an electromotive force (open circuit voltage) was measured and it was found to be 0.50 V under no load, whereas when load was applied to the fuel cell, a current of 0.73 A (29 mA/cm$^2$) was obtained at a voltage of 0.4 V.

Comparative Example 1

An anode and a cathode were prepared in the same manner as in Example 1, and the anode and the cathode were incorporated in an acrylic resin-made two tank cell composed of an anode tank and a cathode tank divided by a NAFION 117 membrane provided at the center of the tank as a separator. A liquid reducing agent was poured into the anode tank and a liquid oxidizing agent into the cathode tank. As the reducing agent, 1 N aqueous solution of hydrochloric acid containing stannous chloride ($SnCl_2$) at a concentration of 0.42% by weight was used, while as the oxidizing agent, 1 N aqueous solution of hydrochloric acid containing ferric chloride ($FeCl_3$) at a concentration of 0.61% by weight was used. The normal electrode potential of stannous chloride ($SnCl_2$) and ferric chloride ($FeCl_3$) are 0.07 V vs. NHE (normal hydrogen electrode) and 0.77 V vs. NHE, respectively. Thus prepared cell is corresponding to a cell of Example 1 in which a liquid reducing agent and a liquid oxidizing agent are used in place of gas reducing agent and oxidizing agent, respectively.

The anode and the cathode were connected to a cell charge-discharge device (HJ-201B available from Hokuto Denko K.K.) and a discharge curve was recorded on a recorder connected with the device under discharge at a constant current of 1 mA/cm$^2$. The electromotive force of the cell was found to be 0.4 V at first, but it began decreasing soon to reach 0.3 V. The electromotive force of the cell continued decreasing and, after eight hours, it became zero. Upon ceasing the discharge at a constant current, the electric voltage was recovered to a value of 0.5 V. Thereafter, the current density was raised to 5 mA/cm$^2$, however, the voltage fell immediately and the capacity decreased sharply.

Example 2

1.8 g of powder of oxidized and dedoped polyaniline obtained in Reference Example 1 was mixed with 0.4 g of powder of electroconductive carbon black (KETJENBLACK EC available from Akzo) and 0.2 g of carbon supporting 20% by weight of platinum thereon (EC-20-PTC available from Electrochem) and ground in a ceramic mortar for ten minutes until a uniform mixture was obtained.

0.27 g of polyvinylidene fluoride resin (KYNAR available from Kureha K.K.) was dissolved in 10.53 g of N,N-dimethylformamide to prepare a 2.5% by weight concentration solution of the resin. The mixture of powder of electroconductive polyaniline and powder of electroconductive carbon black was added to the solution of polyvinylidene fluoride resin and mixed in a mortar to prepare a paste.

The paste was applied to a 5.8 cm square carbon paper (TGP-H-90 available from Toray K.K., having a thickness of 260 μm) and dried at a temperature of 80° C. for 60 minutes in a hot air dryer. Then a 5% by weight concentration NAFION solution (available from Aldrich) was applied on the thus treated carbon paper, heated and dried at a temperature of 80° C. for 15 minutes, thereby providing an electrode used as cathode.

Powder of oxidized and dedoped polyaniline obtained in Reference Example 1 was added to a solution of hydrazine monohydrate in methanol and stirred for eight hours to reduce the polyaniline. The resulting reaction mixture was filtered using a Nutsche funnel and a suction bottle, thereby preparing "reduced and dedoped" polyaniline.

1.8 g of powder of the reduced and dedoped polyaniline was mixed with 0.4 g of powder of electroconductive carbon black (KETJENBLACK EC available from Akzo) and 0.2 g of carbon supporting 20% by weight of platinum thereon, and ground in a ceramic mortar for ten minutes to prepare a uniform mixture.

0.27 g of polyvinylidene fluoride resin (KYNAR available from Kureha K.K.) was dissolved in 10.53 g of N,N-dimethylformamide to prepare a 2.5% by weight concentration solution of the resin. The mixture of powder of the electroconductive carbon black and powder of the reduced and dedoped polyaniline was added to the solution of polyvinylidene fluoride resin and mixed in a mortar to prepare a paste. The paste was applied to a 5.8 cm square carbon paper (TGP-H-90 available from Toray K.K., having a thickness of 260 μm) and dried at a temperature of 80° C. for 60 minutes in a hot air dryer. Then a 5% by weight concentration NAFION solution (available from Aldrich) was applied on the thus treated carbon paper, heated and dried at a temperature of 80° C. for 15 minutes, thereby providing an electrode used as anode.

An acidic NAFION (registered trademark) 117 membrane (available from Dupont) was sandwiched between the thus prepared cathode and anode as a proton exchangeable membrane, and these elements were formed to an electrode-proton exchangeable membrane assembly at a temperature of 130° C. and a pressure of 3 MPa with a hot press. A single fuel cell for test was put together using the assembly.

This single fuel cell was incorporated into a fuel cell validation device (available from Toyo Corporation K.K.). While the cell was kept at a temperature of 70° C., oxygen gas was heated at a temperature of 70° C. in a humidifier and supplied to the cathode at a rate of 500 mL/min. and hydrogen gas was heated at a temperature of 80° C. in a humidifier and supplied to the anode at a rate of 500 mL/min. At first, an electromotive force (open circuit voltage) was measured and it was found to be 0.60 V under no load, whereas when load was applied to the fuel cell, a current of 0.85 A (34 mA/cm$^2$) was obtained at a voltage of 0.4 V.

Example 3

43.6 g of aqueous solution of phenolsulfonic acid novolac resin (free acid type, available from Konishi Kagaku K.K., having a solid content of 45.9% and a weight-average molecular weight of 22000 in terms of sodium polystyrene sulfonate as measured by a GPC method) was diluted with 56.4 g of ion exchange water. 12.0 g of powder of oxidized dedoped polyaniline was added to the aqueous solution of phenolsulfonic acid novolac resin, heated in a hot water bath at 80° C. for two hours, followed by standing overnight at room temperatures. The blackish brown oxidized and dedoped polyaniline turned blackish green immediately after it was added to the aqueous solution of phenolsulfonic acid novolac resin, showing that the polyaniline was doped with the phenolsulfonic acid novolac resin.

The powder of the thus doped polyaniline was collected by suction-filtration with a Nutsche, dispersed in methanol, and washed with stirring. After this operation was repeated three times, the powder was collected by filtration, and dried under vacuum at 60° C. for five hours. The thus obtained doped polyaniline was molded to a disk by using a tablet molding machine and was found to have an electroconductivity of 4.1 S/cm as measured by a van der Pauw method.

720 mg g of powder of the doped polyaniline was mixed with 80 mg of powder of carbon supporting 20% by weight of platinum thereon (EC-20-PTC available from Electrochem) and 160 mg of powder of electroconductive carbon black (KETJENBLACK EC available from Akzo) and ground in a ceramic mortar for ten minutes until a uniform mixture was obtained. 6 g of 2.5% by weight concentration solution of polyvinylidene fluoride resin in N,N-dimethylformamide was added to the mixture and ground in a mortar to prepare a paste.

The paste was applied to a 5.8 cm square carbon paper (TGP-H-90 available from Toray K.K., having a thickness of 260 µm) and dried at a temperature of 80° C. for 60 minutes to prepare an electrode. The increase in weight was found to be about 234 mg, and hence the amount of platinum supported on the electrode was calculated to be 0.10 mg per square centimeters of the area of the electrode. Then a 5% by weight NAFION solution (available from Aldrich) was applied on the thus treated carbon paper, heated and dried at a temperature of 80° C. for 15 minutes, thereby providing an electrode used as cathode.

A further electrode was prepared in the same manner as above. The electrode was dipped in a 20% by weight concentration aqueous solution of phenolsulfonic acid novolac resin and a cyclic voltammogram was obtained using a potentiostat/galvanostat (HA-501) and a function generator (HB-105), both being available from Hokuto Denko K.K., a saturated calomel electrode (SCE) as a reference electrode and platinum wire of a diameter of 0.5 mm as a counterpart electrode under the conditions of potential range of from −0.2 to 0.6 V vs. SCE and a sweep rate of 20 mV/sec. The oxidation peak of polyaniline was observed at 0.5 V vs. SCE while the reduction peak of polyaniline at −0.1 V vs. SCE. Accordingly, while the electric potential of potentiostat was fixed at −0.1 V, the electrode was electrochemically reduced, thereby providing an electrode for use as an anode.

An acidic NAFION (registered trademark) 117 membrane (available from Dupont) was sandwiched between the thus prepared cathode and anode as a proton exchangeable membrane, and these elements were formed to an electrode-proton exchangeable membrane assembly at a temperature of 130° C. and a pressure of 3 MPa with a hot press. A single fuel cell for test was put together using the assembly.

This single fuel cell was incorporated into a fuel cell validation device (available from Toyo Corporation K.K.). While the cell was kept at a temperature of 70° C., oxygen gas was heated at a temperature of 70° C. in a humidifier and supplied to the cathode at a rate of 500 mL/min. and hydrogen gas was heated at a temperature of 80° C. in a humidifier and supplied to the anode at a rate of 500 mL/min. At first, an electromotive force (open-circuit voltage) was measured found to be 0.69 V under no load, whereas when load was applied to the fuel cell, a current of 6.33 A (253 mA/cm$^2$) was obtained at a voltage of 0.4 V.

Examples 4-12 and Comparative Example 2

Carbon supporting 10% by weight of palladium, carbon supporting 5% by weight of ruthenium, carbon supporting 5% by weight of rhodium and such transition metals or their oxides as listed in Table 1 were used together with the electroconductive organic polymer respectively in place of carbon supporting 20% by weight of platinum in Example 3, and otherwise in the same manner, anodes and cathodes were prepared. Using each of these electrodes, an electrode-proton exchangeable membrane assembly was prepared and incorporated into a single fuel cell for test. Urushihara nickel was prepared according to the "Organic Synthetic Chemistry", Vol. 32, No. 11, pp. 951-958 (1974).

An acidic NAFION (registered trademark) 117 membrane (available from Dupont) was sandwiched between the thus prepared cathode and anode as a proton exchangeable membrane, and these elements were formed to an electrode-proton exchangeable membrane assembly at a temperature of 130° C. and a pressure of 3 MPa with a hot press. A single fuel cell for test was put together using the assembly.

This single fuel cell was incorporated into a fuel cell validation device (available from Toyo Corporation K.K.). While the cell was kept at a temperature of 70° C., oxygen gas was heated at a temperature of 70° C. in a humidifier and supplied to the cathode at a rate of 500 mL/min. and hydrogen gas was heated at a temperature of 80° C. in a humidifier and supplied to the anode at a rate of 500 mL/min. At first, an electromotive force (open circuit voltage) was measured under no load, and then the value of current was measured under load at a voltage of 0.4 V. The results are shown in Table 1.

For comparison, the result when powder of lead or lead oxide which is neither a hydrogenation catalyst nor an autoxidation catalyst was used in place of the inorganic oxidation-reduction catalyst was shown in Table 1 as Comparative Example 2.

TABLE 1

| | Inorganic Oxidation · Reduction Catalyst | | Open Circuit | Current at 0.4 V | |
|---|---|---|---|---|---|
| | Anode | Cathode | Voltage (V) | (A) | [mA/cm$^2$] |
| Example 4 | 10% by weight Pd/Carbon | 10% by weight Pd/Carbon | 0.70 | 5.83 | [233] |
| 5 | 5% by weight Ru/Carbon | 5% by weight Ru/Carbon | 0.71 | 5.65 | [226] |
| 6 | 5% by weight Rh/Carbon | 5% by weight Rh/Carbon | 0.68 | 4.77 | [191] |
| 7 | Reduced copper | Silver oxide | 0.65 | 4.32 | [173] |
| 8 | Nickel | Silver oxide | 0.65 | 4.13 | [165] |
| 9 | Reduced iron | Iron(II) iron(III) oxide | 0.64 | 4.88 | [195] |
| 10 | Cobalt | Cobalt(III) oxide | 0.66 | 4.98 | [199] |
| 11 | Molybdenum | Iron(II) iron(III) oxide | 0.67 | 5.03 | [201] |
| 12 | Urushihara Nickel | Cobalt(III) oxide | 0.69 | 5.34 | [214] |
| Comparative Example 2 | Lead | Lead oxide | 0.49 | 0.69 | [28] |

Example 13

A mixture of powder of polyaniline doped with phenolsulfonic acid novolac resin, carbon supporting 20% by weight of platinum thereon (EC-20-PTC available from Electrochem), powder of electroconductive carbon black (KETJENBLACK EC available from Akzo) and polyvinylidene fluoride was supported on a 5.8 cm square carbon paper (TGP-H-90 available from Toray K.K., having a thickness of 260 μm) to prepare an electrode. The amount of platinum supported on the electrode was calculated to be 0.10 mg per square centimeters. Then a 5% by weight concentration NAFION solution (available from Aldrich) was applied on the thus treated carbon paper, heated and dried at a temperature of 80° C. for 15 minutes, thereby providing an electrode used as cathode.

An anode was prepared in a manner mentioned below using polypyridine that is an n-type electroconductive organic polymer prepared according to Chemistry Letter, 153-154, 1988. 400 mg of polypyridine was mixed with 44 mg of carbon supporting 20% by weight of platinum thereon (EC-20-PTC available from Electrochem), and 80 mg of powder of electroconductive carbon black (KETJENBLACK EC available from Akzo), and ground in a ceramic mortar for ten minutes to prepare a uniform mixture. 2.1 g of 2.5% by weight solution of polyvinylidene fluoride in N,N-dimethylformamide was added to the mixture and ground in a mortar to prepare a paste.

The paste was applied to a 5.8 cm square carbon paper (TGP-H-90 available from Toray K.K., having a thickness of 260 μm) and dried at a temperature of 80° C. for 60 minutes to prepare an electrode.

The electrode was dipped in a 20% by weight concentration aqueous solution of phenolsulfonic acid novolac resin and a cyclic voltammogram was obtained using a potentiostat/galvanostat (HA-501) and a function generator (HB-105), both being available from Hokuto Denko K.K., a saturated calomel electrode (SCE) as a reference electrode and platinum wire of a diameter of 0.5 mm as a counterpart electrode under the conditions of potential range of from –0.2 to 0.5 V vs. SCE and a sweep rate of 20 mV/sec. The reduction peak of polypyridine was observed at –0.2 V vs. SCE, however, no reduction peak was observed in the positive potential region, showing that the polypyridine was an n-type electroconductive polymer.

Then, the polypyridine was reduced at a fixed potential of potentiostat at –0.2 V vs. SCE. It was assumed that electrons and protons were injected into the polypyridine under acidic conditions by the reduction so that the polypyridine came to have a structure as shown by the equation (II):

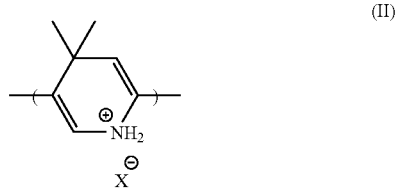

(II)

An anode was prepared in this manner. An acidic NAFION (registered trademark) 117 membrane (available from Dupont) was sandwiched between the thus prepared cathode and anode as a proton exchangeable membrane, and these elements were formed to an electrode-proton exchangeable membrane assembly at a temperature of 130° C. using a hot press, and a single fuel cell for test was put together using the assembly.

This single fuel cell was incorporated into a fuel cell validation device (available from Toyo Corporation K.K.). While the cell was kept at a temperature of 70° C., oxygen gas was heated at a temperature of 70° C. in a humidifier and supplied to the cathode at a rate of 500 mL/min. and hydrogen gas was heated at a temperature of 80° C. in a humidifier and supplied to the anode at a rate of 1000 mL/min. At first, an electromotive force (open circuit voltage) was measured under no load and it was found to be 0.78 V, whereas when load was applied to the fuel cell, a current of 7.82 A (313 mA/cm$^2$) was obtained at a voltage of 0.4 V.

Example 14

Indole was subjected to chemical oxidation polymerization in an aqueous solution of phenolsulfonic acid novolac resin using ammonium peroxodisulfate as an oxidizing agent to provide powder of an electroconductive polymer which was doped by the phenolsulfonic acid novolac resin and in part by sulfuric acid. The powder was suction-filtered with a Nutsche funnel, stirred in and washed with methanol, and dried in vacuo at a temperature of 50° C. for five hours. The obtained powder was press-molded to a disk having a diameter of 13 mm and a thickness 720 μm using a tablet molding machine. The electroconductivity of the disk was found to be $1.2 \times 10^{-1}$ S/cm as measured by the van der Pauw method.

420 mg of polyindole was mixed with 44 mg of carbon supporting 20% by weight of platinum thereon (EC-20-PTC available from Electrochem) and 80 mg of powder of electroconductive carbon black (KETJENBLACK EC available from Akzo), and ground in a ceramic mortar for ten minutes to prepare a uniform mixture. 2.1 g of 2.5% by weight concentration solution of polyvinylidene fluoride in N,N-dimethylformamide was added to the mixture and ground in a mortar to prepare a paste.

The paste was applied to a 5.8 cm square carbon paper (TGP-H-90 available from Toray K.K., having a thickness of 260 μm) and dried at a temperature of 80° C. for 60 minutes to prepare an electrode. Then a 5% by weight NAFION solution (available from Aldrich) was applied on the thus treated carbon paper, heated and dried at a temperature of 80° C. for 15 minutes, thereby providing an electrode used as cathode.

An anode was prepared in a manner described below using polyphenylquinoxaline that is an n-type electroconductive organic polymer. First, according to P. M. Hergenrother, H. H. Levine, J., Polymer Sci., Part A-1, 5, 1453-1466 (1967), 3,4, 3',4'-tetraamino-biphenyl was reacted with 1,4-bisbenzil in m-cresol to prepare a high viscosity solution of polyphenylquinoxaline. After the solution was diluted with m-cresol, it was added to methanol to form precipitate of powder of polyphenylquinoxaline. The powder was collected by suction-filtration using a Nutsche funnel and dried in vacuo at a temperature of 60° C.

435 mg of polyphenylquinoxaline was mixed with 40 mg of carbon supporting 20% by weight of platinum thereon (EC-20-PTC available from Electrochem), and 80 mg of powder of electroconductive carbon black (KETJENBLACK EC available from Akzo), and ground in a ceramic mortar for ten minutes to prepare a uniform mixture. 2.1 g of 2.5% by weight concentration solution of polyvinylidene fluoride in N,N-dimethylformamide was added to the mixture and ground in a mortar to prepare a paste.

The paste was applied to a 5.8 cm square carbon paper (TGP-H-90 available from Toray K.K., having a thickness of 260 μm) and dried at a temperature of 80° C. for 15 minutes to prepare an electrode. Then a 5% by weight NAFION solution (available from Aldrich) was applied on the thus treated carbon paper, heated and dried at a temperature of 80° C. for 15 minutes, thereby providing an electrode The electrode was dipped in a 20% by weight concentration aqueous solution of phenolsulfonic acid novolac resin and a cyclic voltammogram was obtained using a potentiostat/galvanostat (HA-501) and a function generator (HB-105), both being available from Hokuto Denko K.K., a saturated calomel electrode (SCE) as a reference electrode and platinum wire of a diameter of 0.5 mm as a counterpart electrode under the conditions of potential range of from −0.2 to 0.5 V vs. SCE and a sweep rate of 20 mV/sec. The reduction peak of polyphenylquinoxaline was observed at −0.10 V vs. SCE, however, no reduction peak was observed in the positive potential region, showing that the polyphenylquinoxaline was an n-type electroconductive polymer.

Then, the polyphenylquinoxaline was electrochemically reduced at a fixed potential of potentiostat of −0.10 V. It was assumed that electrons and protons were injected into the polyphenylquinoxaline under acidic conditions by the reduction so that the polyphenylquinoxaline came to have a structure as shown by the equation (III):

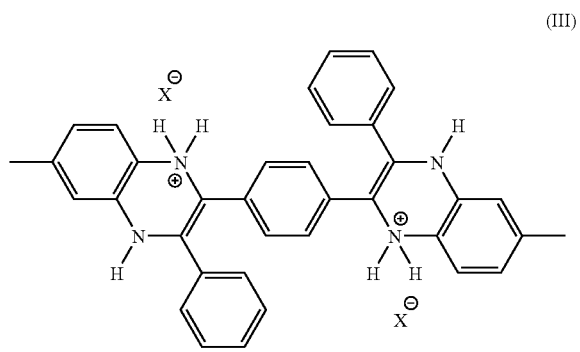

(III)

An anode was prepared in this manner. An acidic NAFION 117 membrane (available from Dupont) was sandwiched between the thus prepared cathode and anode as a proton exchangeable membrane, and these elements were formed to an electrode-proton exchangeable membrane assembly at a temperature of 130° C. using a hot press, and a single fuel cell for test was put together using the assembly.

This single fuel cell was incorporated into a fuel cell validation device (available from Toyo Corporation K.K.). While the cell was kept at a temperature of 70° C., oxygen gas was heated at a temperature of 70° C. in a humidifier and supplied to the cathode at a rate of 500 mL/min. and hydrogen gas was heated at a temperature of 80° C. in a humidifier and supplied to the anode at a rate of 1000 mL/min. At first, an electromotive force (open-circuit voltage) was measured under no load and it was found to be 1.20 V, whereas when load was applied to the fuel cell, a current of 24.6 A (984 mA/cm$^2$) was obtained at a voltage of 0.4 V.

INDUSTRIAL APPLICABILITY

As described above, the fuel cell of the invention has electrodes on which an electroconductive organic polymer having an oxidation-reduction function is supported as an electrode catalyst. When it is operated in such a manner that a gas oxidizing agent is supplied to a cathode and a gas reducing agent is supplied to an anode, it has a high electromotive force and it discharges at a high current density, that is, the fuel cell of the invention has a high output power. The fuel cell of the invention has a higher output power when an electroconductive organic polymer is used in combination with an inorganic oxidation-reduction catalyst as an electrode catalyst.

The invention claimed is:

1. An electrically conductive polyaniline composition which comprises polyaniline doped with water-soluble phenolsulfonic acid novolac resin.

2. An electrically conductive polyaniline composition according to claim 1, wherein the polyaniline comprises a repeating unit represented by the general formula (I)

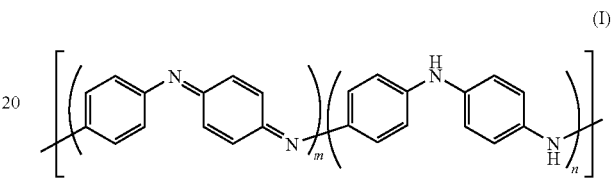

(I)

wherein m and n are molar fractions of a quinonediimine structural unit and a phenylenediamine structural unit, respectively, in the repeating unit, and are numerals satisfying the conditions:

$0 < m \leq 1$, $0 \leq n < 1$ and $m+n=1$.

3. A method for producing an electrically conductive polyaniline composition which comprises adding polyaniline to aqueous solution of phenolsulfonic acid novolac resin thereby doping the polyaniline with the resin.

4. A method for producing an electrically conductive polyaniline composition according to claim 3, wherein the polyaniline comprises a repeating unit represented by the general formula (I)

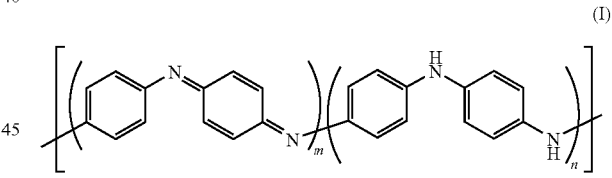

(I)

wherein m and n are molar fractions of a quinonediimine structural unit and a phenylenediamine structural unit, respectively, in the repeating unit, and are numerals satisfying the conditions:

$0 < m \leq 1$, $0 \leq n < 1$ and $m+n=1$.

* * * * *